United States Patent [19]
Hollingshead

[11] Patent Number: 6,000,238
[45] Date of Patent: Dec. 14, 1999

[54] CARBON DIOXIDE SNOW BLANKETING DEVICE

[75] Inventor: Julian Hollingshead, Hoboken, N.J.

[73] Assignee: The BOC Group, Inc., New Providence, N.J.

[21] Appl. No.: 08/909,544

[22] Filed: Aug. 12, 1997

[51] Int. Cl.[6] .................................................. F25J 1/00
[52] U.S. Cl. .................................................... 62/603
[58] Field of Search ................................................ 62/603

[56] References Cited

U.S. PATENT DOCUMENTS

| | | |
|---|---|---|
| 3,667,242 | 6/1972 | Kilburn ............................ 62/603 |
| 3,786,644 | 1/1974 | Rich et al. ....................... 62/603 |
| 3,905,555 | 9/1975 | Gateshill et al. . |
| 3,932,155 | 1/1976 | Pietrucha et al. . |
| 3,952,530 | 4/1976 | Tyree, Jr. . |
| 4,015,440 | 4/1977 | Pietrucha et al. . |
| 4,111,362 | 9/1978 | Carter, Jr. . |
| 4,111,671 | 9/1978 | Williamson . |
| 4,265,921 | 5/1981 | Lermuzeaux . |
| 4,287,719 | 9/1981 | Students . |
| 4,375,755 | 3/1983 | Barbini et al. . |
| 4,377,402 | 3/1983 | Crowe et al. . |
| 4,381,649 | 5/1983 | Franklin . |
| 4,444,023 | 4/1984 | Barbini et al. . |
| 4,652,287 | 3/1987 | Allen et al. . |
| 4,911,362 | 3/1990 | Delich . |
| 5,538,184 | 7/1996 | Karbanowicz et al. . |

FOREIGN PATENT DOCUMENTS

| | | |
|---|---|---|
| 155 397 | 4/1903 | Germany . |
| 1181186 | 11/1964 | Germany ........................... 62/603 |
| 1 371 849 | 10/1974 | United Kingdom . |

*Primary Examiner*—Ronald Capossela
*Attorney, Agent, or Firm*—William A. Schoneman; Salvatore P. Pace

[57] ABSTRACT

Apparatus and method for delivering solid carbon dioxide flakes to a substrate in which a housing is provided with at least one passageway having operatively connected thereto a solid carbon dioxide generator. The tubes are heated to an extent sufficient to substantially prevent the solid carbon dioxide flakes from adhering to the walls of the tubes so as to maintain continuous operation and to provide a uniform flow of solid carbon dioxide flakes to the substrate.

17 Claims, 4 Drawing Sheets

CARBON DIOXIDE SNOW BLANKETING DEVICE

FIELD OF THE INVENTION

The present invention is directed to a device for delivering solid carbon dioxide to a substrate such as a moving conveyor belt which may have foodstuffs thereon in which the device includes a housing having at least one passageway through which the solid carbon dioxide is transported. Heat is provided to the passageway to an extent sufficient to substantially prevent the solid carbon dioxide from adhering to the walls of the passageway.

BACKGROUND OF THE INVENTION

Solid carbon dioxide in the form of solid flakes or "snow" is formed by passing liquid carbon dioxide through a narrow orifice under a significant pressure drop resulting a sudden, drastic reduction in temperature and in the formation of solid carbon dioxide flakes or snow.

Solid carbon dioxide snow is a desirable substance for the chilling and/or freezing of foodstuffs. Solid carbon dioxide flakes exist at a temperature of approximately −109 F. and therefore can provide rapid cooling and/or freezing of seafood, fish, poultry, meats, vegetables and the like. In addition, the solid carbon dioxide flakes vaporize when heated thereby leaving no residue on the foodstuffs. For these reasons, as well as its relatively low cost, solid carbon dioxide is an effective heat exchange medium for use in commercial freezers requiring a high throughput. In addition, solid carbon dioxide flakes prevent pieces of foodstuffs from sticking to each other. The flakes sublime on the surfaces of foodstuffs while freezing the moisture on the surfaces thus preventing the pieces of foodstuffs from freezing together. Similarly, the flakes prevent foodstuffs from adhering to the conveyor belt as it moves through the refrigeration process.

Solid carbon dioxide flakes are typically produced by taking liquid carbon dioxide which exists at high pressures (e.g. 300 psi) and passing the same through a restricted orifice or nozzle. The temperature of the liquid carbon dioxide under such pressures is typically about 0 F. However, the passing of the liquid carbon dioxide through a restricted orifice results in a rapid and significant pressure drop and a corresponding rapid and sudden decrease in temperature to about −109 F.

The solid carbon dioxide is typically applied to foodstuffs in commercial refrigeration systems either directly from the nozzle or from a nozzle which has attached thereto a tube for directing the flow of the solid carbon dioxide flakes to a substrate such as foodstuffs on a moving conveyer belt.

Each of these systems for directing solid carbon dioxide flakes to a moving conveyor belt often does not provide a uniform coating across the width of the conveyor belt of the solid carbon dioxide flakes over the foodstuffs. With regard to the employment of a nozzle assembly alone, the sudden reduction in pressure and the concurrent formation of solid carbon dioxide flakes results in a forceful and non-uniform spray of the flakes over a wide area. The nozzle assembly which is typically comprised of a single nozzle directs the flakes at an angle to the moving conveyor or belt such that a portion of the flakes miss the surface of the belt and/or are concentrated in one region of the belt. In particular, the resulting coating profile typically provides greater deposition of solid carbon dioxide flakes in the center of the spray region as opposed to the outer fringes of the spray region.

This problem can, to some extent, be corrected by the use of a tube surrounding the nozzle head and extending to the proximity of the substrate. The tube prevents the solid carbon dioxide flakes from traveling over a wide region and therefore can provide a more uniform coating profile than the nozzle alone. However, the walls of the tube become cooled by the solid carbon dioxide flakes to such an extent that the solid carbon dioxide flakes begin to adhere to the walls of the tube. This occurs especially when there is no significant difference in temperature between the tube walls and the surrounding environment such as when the tubes are within the refrigeration system. This causes the formation of agglomerates or lumps of solid carbon dioxide flakes which restricts the flow thereof and can in some circumstances actually cut off the flow of the solid carbon dioxide flakes to the substrate. When this happens, it is necessary to shut down the solid carbon dioxide flake generator and clean the tubes which results in lost production time and higher cost of cooling/freezing.

It would therefore be a significant advance in the art of employing solid carbon dioxide flakes for cooling and/or freezing of foodstuffs to be able to apply the same in a uniform manner. It would be a further advance in the art to be able to apply the solid carbon dioxide flakes in a uniform manner in a system which can run continuously without frequent shut downs to remove agglomerations of the solid carbon dioxide flakes.

SUMMARY OF THE INVENTION

The present invention is generally directed to a system for delivering solid carbon dioxide flakes to a substrate in a continuous and preferably uniform manner. In particular, the present invention is directed to an apparatus and method for delivering solid carbon dioxide flakes to a substrate comprising:

a) a housing having at least one passageway, each passageway defined by at least one wall, said passageway having a first end operatively connected to a solid carbon dioxide generating means and an opposed second end in proximity to said substrate; and b) heating means for raising the temperature of said passageway to an extent sufficient to substantially prevent the solid carbon dioxide flakes from adhering to the at least one wall as solid carbon dioxide flakes pass through the passageway toward the substrate.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

The present invention is directed to an apparatus and method for delivering solid carbon dioxide to a substrate so that a continuous and preferably uniform distribution of solid carbon dioxide is obtained and the delivery of the same can be accomplished without frequent shutdowns to clean or unclog the device. In one embodiment of the invention, a fluid, having a temperature higher than the temperature of the solid carbon dioxide flakes, provides heat to prevent the build-up of solid carbon dioxide flakes within the device so that the same can be delivered in a uniform manner.

Figure 1:
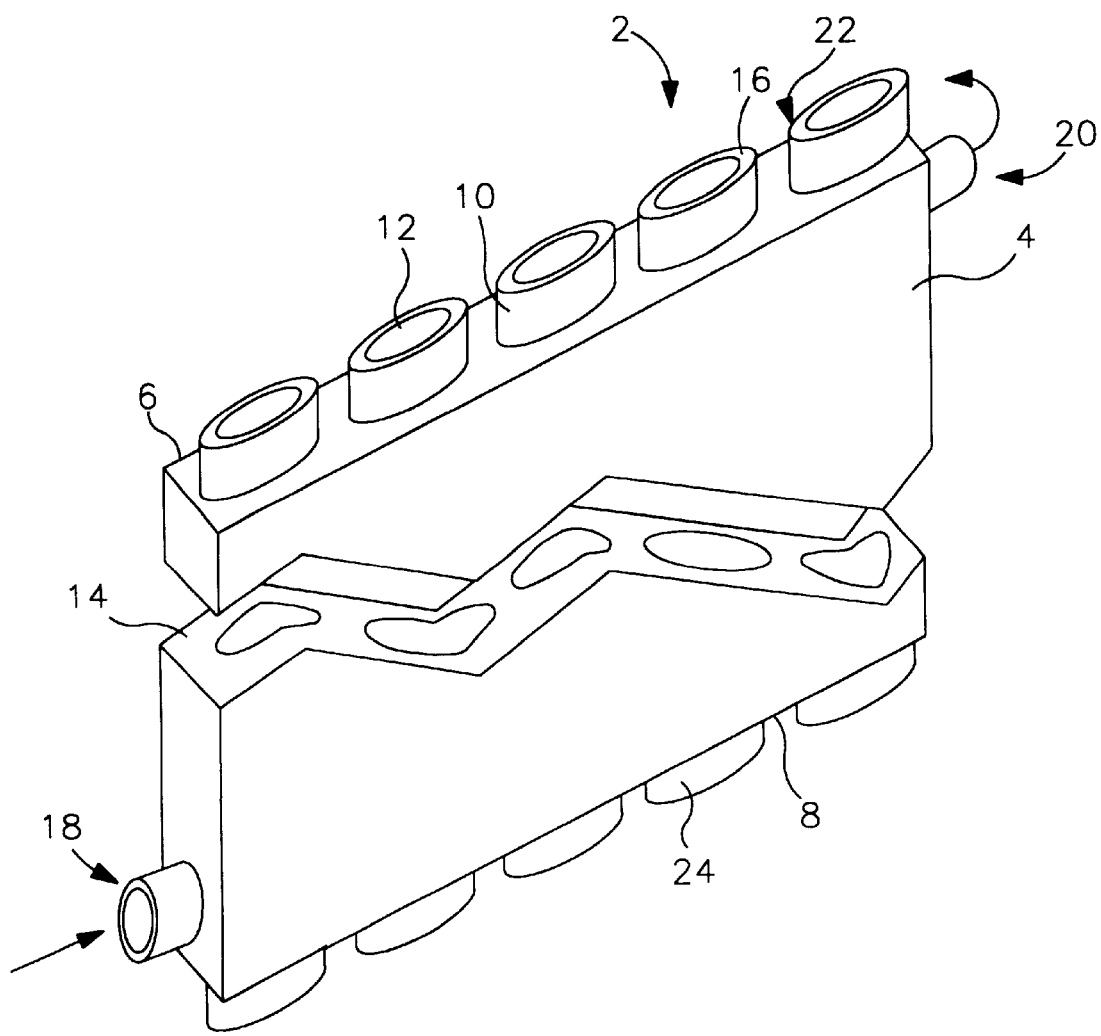
FIG. 1 is an exploded view of a device in accordance with the present invention employing a fluid for controlling the temperature of the passageways through which the solid carbon dioxide flakes pass.

Referring to FIG. 1, there is shown a device 2 for delivering solid carbon dioxide flakes to a substrate (not shown). The device 2 includes a housing 4 having a top end 6 and a bottom end 8. Extending from the top end 6 to the bottom end 8 of the housing 4 is at least one, preferably a plurality of spaced apart tubes 10 defining respective passageways 12 through which the solid carbon dioxide flakes travel. In the embodiment shown in FIG. 1, each of the tubes 10 is positioned within a continuous chamber 14 which has circulating therethrough a fluid such as a liquid medium as explained hereinafter. The fluid contained in the chamber 14 is in heat exchange contact with walls 16 defining each of the tubes 10.

The chamber 14 has an inlet 18 for receiving the fluid and an outlet 20 for discharging the fluid which may be discharged from the system, recycled, or in a preferred application be used as a source of material for generating solid carbon dioxide flakes.

Each of the tubes 10 has a top end 22 and a bottom end 24. The top end 22 of the tube 10 is adapted to be operatively connected to a solid carbon dioxide flake generator as described hereinafter. The bottom end 24 of the tube 10 is positioned proximate to a substrate (not shown) which can, for example, be a moving conveyor belt having foodstuffs thereon as employed in a commercial refrigeration system.

Figure 3:
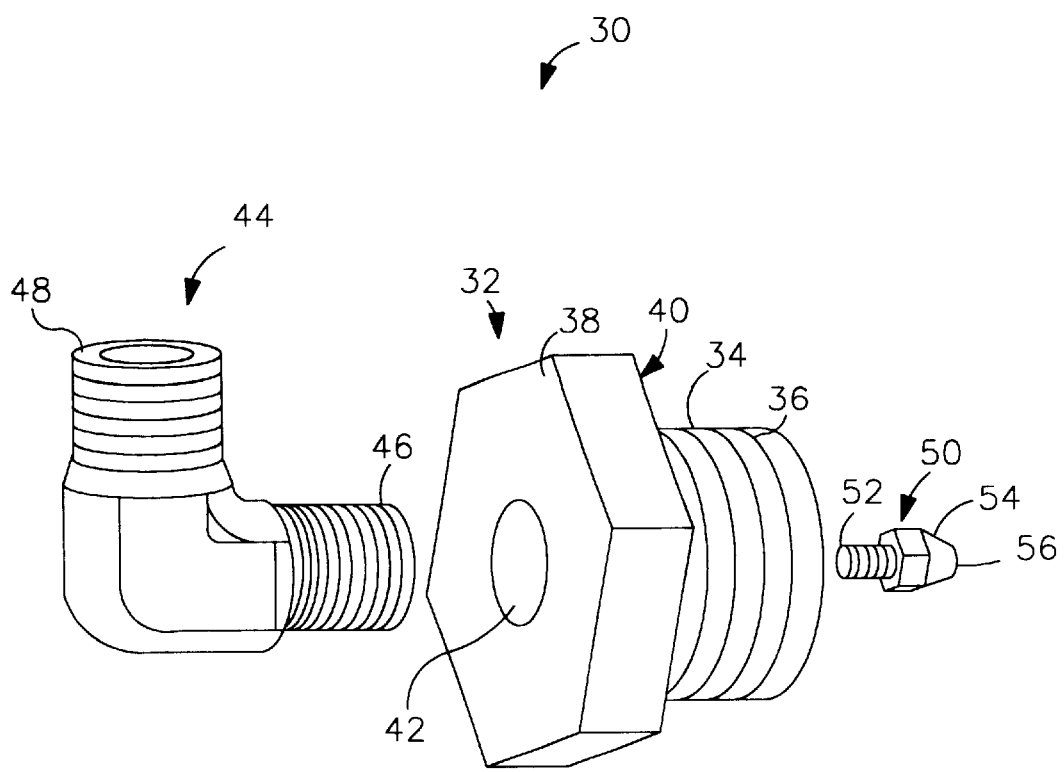
FIG. 3 is an exploded view of a solid carbon dioxide flake generating device.

An example of a typical solid carbon dioxide flake generator, which is insertable into the top end 22 of the tube 10 is shown in FIG. 3. Referring to FIG. 3, the solid carbon dioxide flake generator 30 includes a housing 32 having a cylindrical base 34 with threads 36 thereon for reversibly inserting the base 34 into the top end 22 of the tube shown in FIG. 1.

The housing 32 has an upper section 38 which has an undersurface 40 for providing flat face contact with the top end 24 of the tube 10. A centrally positioned hole 42 is provided for receiving an elbow connector 44 at a first end 46 thereof. A second end 48 of the connector 44 is attached to a source of material that is capable of generating solid carbon dioxide flakes (i.e. liquid carbon dioxide).

The housing 32 is adapted to receive a nozzle 50. The nozzle 50 has a rearward end 52 for connection to the housing 32 and a forward end 54 with an aperture 56 of smaller diameter than the opening in the rearward end 52 for injection of the liquid carbon dioxide.

In operation, liquid carbon dioxide enters the second end 48 of the elbow connector 44 and passes through the connector into the nozzle 50. When the liquid carbon dioxide is released through the nozzle 50, there is a sudden and significant reduction in pressure which results in the transformation of the liquid carbon dioxide into solid carbon dioxide flakes.

The nozzle 50 extends into the tube 10 shown in FIG. 1 so that the solid carbon dioxide flakes travel through the passageway 12 and out of the bottom end 24 of the tube 10.

In accordance with the present invention, the solid carbon dioxide flakes which pass through the passageway 12 are prevented from adhering to the tube 10 because the walls of the tube are heated by a fluid contained in the chamber 14.

The fluid is supplied via the inlet 18 into the chamber 14. The fluid can be any fluid which can flow through the chambers and act in heat exchange relationship with the tubes 10. Examples of such fluids include gases such as air, and liquids such as water, propylene glycol, and liquid carbon dioxide. Liquid carbon dioxide is the preferred fluid because the same can be inserted into the solid carbon dioxide flake generator 30 after it leaves the outlet 20 and can therefore serve a dual purpose. First, the liquid carbon dioxide serves as a heat exchange medium in the chamber 14 to heat the walls of the tube 10. Second, the liquid carbon dioxide serves as a source of material for the production of solid carbon dioxide flakes.

The use of liquid carbon dioxide as the heat exchange medium has an additional advantage. From the time the liquid carbon dioxide enters the chamber 14 through the inlet 18, the temperature of the liquid carbon dioxide decreases. This is because the liquid carbon dioxide entering through the inlet is at a higher temperature than the temperature of the tubes 10. The liquid carbon dioxide takes on cooling duty from the tubes (thereby raising the temperature of the tubes) as the liquid travels toward the outlet 20. As a result of the temperature of the liquid carbon dioxide being reduced, the liquid carbon dioxide transferred to the nozzle can produce carbon dioxide flakes in a more efficient manner.

In accordance with the present invention, the fluid heats the walls of the tube so that the temperature is sufficiently high that solid flakes of carbon dioxide do not adhere thereto. The temperature of the walls must be therefore sufficiently high so that the solid carbon dioxide flakes which touch the walls are sublimed into a vapor which readily pass through the passageway 12 of the tube 10 along with the solid carbon dioxide flakes. The temperature of the solid carbon dioxide flakes is approximately −109 F. at atmospheric pressure. The temperature of the walls must therefore be kept at a temperature greater than about −109 F., typically in the range of from about −100 to 30 F.

Figure 2:
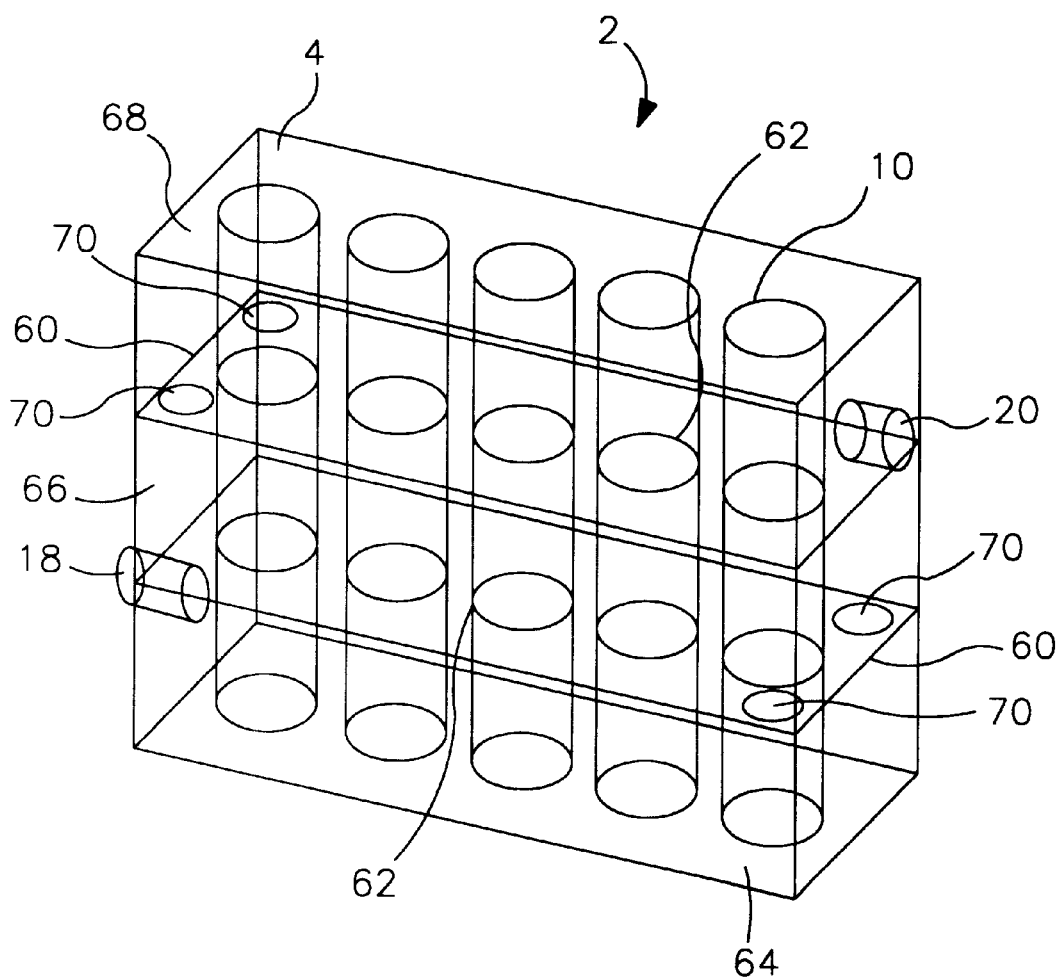
FIG. 2 is a schematic view of a device similar to FIG. 1 employing plates to control the flow of the fluid.

The housing may be provided with at least one plate about the tubes to make heat exchange with the tubes more efficient. Referring to FIG. 2, there is shown a schematic representation of the device of FIG. 1 with two plates 60 spaced apart within the housing 4. The plates 60 have openings 62 therein to enable the tubes 10 to extend from the top end 6 of the housing to the bottom end 8.

The plates 60 divide the inside of the housing into compartments. In the specific embodiment shown in FIG. 2, the two plates 60 divide the inside of the housing into three compartments, a lower compartment 64, a middle compartment 66 and an upper compartment 68.

Fluid communication between the compartments in the embodiment shown in FIG. 2 is provided by openings 70 in the plates 60. As shown in FIG. 2, the fluid entering the housing from the inlet 18 fills the lower compartment 64 and thereafter enters the middle compartment 66 through the openings 70 in the lower plate 60. Once the middle compartment 66 is filled with the fluid, the fluid enters the upper compartment 68 through holes 70 positioned in the upper plate 60. Eventually the fluid, after completing its heat exchange operation, leaves the housing 4 through the outlet 20. During normal operations, the flow of the heat exchange medium will proceed through compartments 64, 66, and 68, respectively and then from the compartment 68 out of the housing 4 through the outlet 20.

The plates 60 need not extend over the entire cross-sectional area of the housing 4. In one embodiment of the invention, the plates are extended from opposed walls of the housing a part of the distance through the housing so as to create a sinusoidal pathway similar to the flow path associated with the embodiment shown in FIG. 2.

Figure 5:
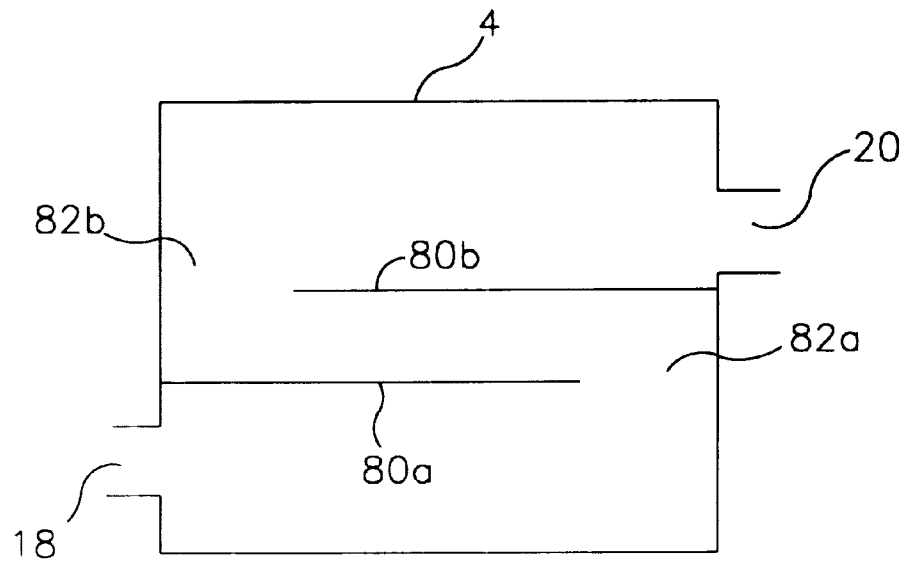
FIG. 5 is a partial schematic view in cross section showing another embodiment of a plate assembly employed to create a sinusoidal flow of the fluid.

Referring to FIG. 5, the housing is provided with plates 80a and 80b which extend from opposite sides of the housing 4. There is thus provided respective gaps 82a and 82b between the ends of the plates 80a and 80b and the respective sides of the housing 4 to create a sinusoidal pathway for the flow of the fluid from the inlet 18 to the outlet 20 as indicated by the arrows shown in FIG. 5. The plates 80a and 80b eliminate the need to have separate holes 70 in the plates of the embodiment of FIG. 2.

In the embodiments shown in FIGS. 1, 2 and 5, a liquid medium is used to provide heat exchange with the tubes to warm the surfaces of the tubes so that agglomeration of the solid carbon dioxide flakes can be avoided. The tubes, however, need not be heated by a fluid. Any means of heating the tubes can be employed including, for example, conduction from a heat source through a conductive material.

Figure 4:
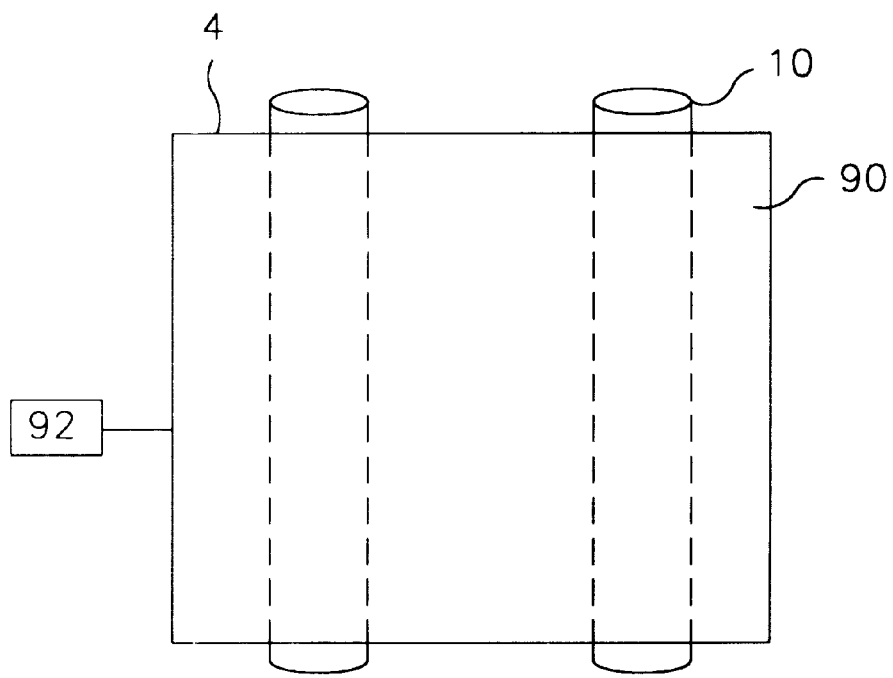
FIG. 4 is a device similar to FIG. 1 except that the housing is composed of a heat conductive material and heat is supplied from an external source.

Referring to FIG. 4, there is shown a device of the present invention in which the housing 4 is comprised of a solid block 90 of a conductive material surrounding the tubes 10. The conductive material can be selected from metals, composites, plastics and the like. The preferred material of construction is a metal and the preferred metal is aluminum. As shown in FIG. 4, heat can be applied from an external source 92 such as by electric heaters. The housing, when constructed of a heat conducting material such as aluminum, radiates heat throughout the housing block so that the temperature of the tubes contained therein is raised. In this embodiment of the invention, the liquid carbon dioxide used to form the solid carbon dioxide flakes is not used as a heat exchange medium. Positioning and operation of a solid carbon dioxide flake generator as discussed above in connection with FIG. 1 is employed in the same manner in the embodiment shown in FIG. 3.

In accordance with the present invention, liquid carbon dioxide is injected through the nozzle positioned at the top ends of the tubes of the present device. Solid carbon dioxide flakes are thus produced and are transported through the tubes downwardly toward the substrate. The tubes are heated by a fluid flowing within the housing or by constructing the device of a heat conductive material and heating the same from an external source. The temperature of the tubes is raised sufficiently so that flakes, upon contact with the higher temperature walls of the tube, sublimates into a vapor thereby allowing solid flakes of carbon dioxide to proceed through the passageway. As a consequence of the present invention, agglomeration of solid carbon dioxide flakes along the tube is avoided enabling the continuous flow of the solid carbon dioxide flakes to the substrate so as to provide a uniform layer of carbon dioxide flakes on the substrate as it passes thereunder.

As previously indicated the present invention can employ a single tube and nozzle to inject solid carbon dioxide flakes on a substrate. Use of a single tube in the present invention presents advantages over prior art devices because the solid flakes do not adhere to the walls of the tube. However, the coating profile may still tend to be uneven wherein a greater portion of the solid flakes are deposited in the central region of the substrate such as a moving conveyor belt.

The employment of multiple spaced apart tubes such as shown in the embodiment of FIG. 1 provides an additional advantage of a single tube assembly. The multiple tube assembly arranged over the width of the substrate tends to provide a more uniform coating profile so that the solid flakes are provided in a substantially uniform thickness over the entire width of the substrate.

The following example is illustrative of an embodiment of the invention and is not intended to limit the invention as encompassed by the claims forming part of the Application.

EXAMPLE 1

A solid carbon dioxide flake generator of the type shown in FIGS. 1 and 3 was employed for this example. The generator measured approximately 10 inches long, 8.5 inches high and has a depth of about 2 inches. The housing contains 5 equally spaced apart tubes having an inner diameter of about 1 inch, an outer diameter of about 1.2 inches, a center to center measurement (the distance from the center of one tube to the center of an adjacent tube) of about 1.875 inches, and a tube length of about 9 inches. The bottom of each tube was positioned about 4 inches above a moving conveyor belt.

The generator was supplied with air at 70 F. at the rate of 20 cubic feet per minute. Each of the tubes was provided with liquid carbon dioxide at the rate of about 6 pounds per minute and upon expansion produced carbon dioxide flakes at the rate of about 2.82 pounds per minute.

The 10 inch wide conveyor belt was made of stainless steel with no side walls. The belt was operated at a constant speed of about 4 inches per second. Diced potatoes having an average size of 0.25 cubic inch was placed on the belt at the rate of 25 pounds per minute.

Continuous operation of the system under the conditions described above resulted in the deposition of solid carbon dioxide flakes at a density of about 36 pounds per cubic foot to provide a substantially uniform deposit of flakes to a depth of about 0.3 inches on the conveyor belt. The diced potatoes were sufficient chilled so that sticking to each other or the moving belt was substantially avoided.

EXAMPLE 2

A solid carbon dioxide flake generator of the type shown in FIGS. 3 and 4 was employed for this example. The generator measured approximately 16 inches long, 8.5 inches high and has a depth of about 2.5 inches. The housing contained 8 equally spaced apart tubes having a diameter of about one inch, a center to center measurement (the distance from the center of one tube to the center of an adjacent tube) of about 1.875 inches, and a tube length of about 9 inches. The bottom of each tube was positioned about 4 inches above a moving conveyor belt.

The solid housing was provided with six heating elements extending into the housing on either side of the tubes. Each element provided about 100 watts of heat to maintain the tubes at a temperature of −28 F. Each of the tubes was provided with liquid carbon dioxide at the rate of about 5.84 pounds per minute and upon expansion produced carbon dioxide flakes at the rate of about 2.74 pounds per minute.

The 16 inch wide conveyor belt was made of stainless steel with no side walls. The belt was operated at a constant speed of about 8 inches per second. Diced chicken having an average size of 0.50 cubic inch was placed on the belt at the rate of 32 pounds per minute.

Continuous operation of the system under the conditions described above resulted in the deposition of solid carbon dioxide flakes at a density of about 36 pounds per cubic foot to provide a substantially uniform deposit of flakes to a depth of about 0.15 inch on the conveyor belt. The diced chicken were sufficiently chilled so that sticking to each other or the moving belt was substantially avoided.

EXAMPLE 3

A solid carbon dioxide flake generator of the type employed in Example 1 is employed for this example.

The generator is supplied with liquid carbon dioxide which has passed through the chamber 14 by entering through inlet 18 and exiting through outlet 20. The liquid carbon dioxide enters the chamber at the rate of about 30 pounds per minute and a temperature of about 0° F. During passage through the chamber, the temperature of the carbon dioxide drops to between about −5° and −10° F. As a consequence, the walls of the tubes are warmed to a temperature between about −10° F. and −100° F. Each of the tubes is provided with the liquid carbon dioxide at the rate of about 6 pounds per minute and upon expansion produces carbon dioxide flakes at the rate of more than about 2.82 pounds per minute.

The belt is operated at a constant speed of about 4 inches per second. Diced potatoes having an average size of 0.25 cubic inch are placed on the belt at the rate of 25 pounds per minute.

Continuous operation of the system under the conditions described above result in the deposition of solid carbon dioxide flakes at a density of about 36 pounds per cubic foot to provide a substantially uniform deposit of flakes to a depth of about 0.3 inches on the conveyor belt. The diced potatoes are sufficiently chilled so that they do not stick to each other or the moving belt.

This example illustrates the improvement in production rate of solid carbon dioxide flakes which can be realized through the use of liquid dioxide as both the heat exchange medium and the source of the solid flakes. This increase in efficiency is, in part, due to the fact that the temperature of the liquid carbon dioxide is reduced at it proceeds through the chamber.

I claim:

1. A device for delivering solid carbon dioxide to a substrate comprising:
   a) a housing having at least one passageway, each passageway defined by at least one wall, said at least one passageway having a first end operatively connected to a solid carbon dioxide generating means and an opposed second end in proximity to said substrate; and
   b) heating means comprising means for raising the temperature of said passageway to an extent sufficient to substantially prevent the solid carbon dioxide from adhering to the at least one wall as the solid carbon dioxide passes through the at least one passageway toward the substrate.

2. The device of claim 1 wherein the heating means comprises a chamber surrounding said at least one passageway and separated from said passageway by said at least one wall, and a fluid contained in said chamber, said fluid being at a temperature sufficiently high so that the fluid raises the temperature of said at least one wall to a temperature sufficient to prevent said carbon dioxide from adhering thereto.

3. The device of claim 2 wherein the heating means comprises a liquid medium.

4. The device of claim 3 wherein the heating means comprising means for maintaining the temperature of the fluid at a temperature of from about −100 to 30 F.

5. The device of claim 4 wherein the fluid is liquid carbon dioxide.

6. The device of claim 2 wherein the heating means comprises means for maintaining the fluid at a temperature greater than about −109 F.

7. The device of claim 2 wherein the chamber is comprised of at least two compartments, each compartment being in fluid communication with at least one other compartment to provide a flow path for the fluid from a fluid inlet to a fluid outlet.

8. The device of claim 7 comprising a plate separating adjacent compartments, said plate having an opening therein to enable the fluid to flow between said adjacent compartments.

9. The device of claim 7 comprising a plate separating adjacent compartments, said plates being spaced apart from at least a portion of the housing to provide a space through which the fluid can flow between the adjacent compartments.

10. The device of claim 1 comprising at least two passageways.

11. The device of claim 10 wherein the at least two passageways provide solid carbon dioxide in a uniform manner onto the substrate.

12. The device of claim 1 wherein the fluid is selected from the group consisting of air, water, propylene glycol and liquid carbon dioxide.

13. The device of claim 1 wherein the housing comprises a solid block of a heat conductive material, said at least one passageway extending from a top end of the housing to a bottom end, said heating means comprising a heat generator for generating heat and transferring the heat to said housing.

14. The device of claim 13 wherein the heat conductive material is selected from the group consisting of metals, plastics and composite materials.

15. The device of claim 14 wherein the heat conductive material is aluminum.

16. The device of claim 10 wherein the housing comprises at least two passageways.

17. The device of claim 16 wherein the at least two passageways provide solid carbon dioxide in a uniform manner onto the substrate.

* * * * *